(12) United States Patent
Sidhpuria et al.

(10) Patent No.: US 9,944,450 B2
(45) Date of Patent: Apr. 17, 2018

(54) FIBER SUITABLE FOR PACKAGING AND STORING PLANT PRODUCE

(71) Applicant: Reliance Industries Limited, Mumbai (IN)

(72) Inventors: Kalpeshkumar Sidhpuria, Gujarat (IN); Prakash Kumar, Gujarat (IN); Gurudatt Krishnamurthy, Karnataka (IN); Shashank Dehade, New Panvel (IN); Sudip Kumar Sarkar, West Bengal (IN); Raksh Vir Jasra, Gujarat (IN)

(73) Assignee: RELIANCE INDUSTRIES LIMITED, Mumbai (IN)

(*) Notice: Subject to any disclaimer, the term of this patent is extended or adjusted under 35 U.S.C. 154(b) by 58 days.

(21) Appl. No.: 14/913,527

(22) PCT Filed: Jul. 22, 2014

(86) PCT No.: PCT/IN2014/000482
§ 371 (c)(1),
(2) Date: Feb. 22, 2016

(87) PCT Pub. No.: WO2015/011723
PCT Pub. Date: Jan. 29, 2015

(65) Prior Publication Data
US 2016/0194136 A1  Jul. 7, 2016

(30) Foreign Application Priority Data
Jul. 22, 2013  (IN) .......................... 2429/MUM/2013

(51) Int. Cl.
B65D 81/28  (2006.01)
B65D 81/26  (2006.01)
(Continued)

(52) U.S. Cl.
CPC ......... B65D 81/266 (2013.01); B01D 53/885 (2013.01); B01J 35/004 (2013.01);
(Continued)

(58) Field of Classification Search
CPC ...... D06M 11/44; D06M 11/79; D06M 11/77; D06M 13/50; D06M 13/51; D06M 13/513;
(Continued)

(56) References Cited

U.S. PATENT DOCUMENTS

2013/0337121 A1  12/2013  Sugano et al.

FOREIGN PATENT DOCUMENTS

| EP | 1188854 | * | 3/2002 | ............ D06M 11/77 |
| JP | 2006112017 | | 4/2006 | |
| WO | 2010095148 | | 8/2010 | |

* cited by examiner

Primary Examiner — Eisa B Elhilo
(74) Attorney, Agent, or Firm — Fish IP Law, LLP

(57) ABSTRACT

The present disclosure relates to a fiber suitable for packaging. The fiber comprises a photocatalyst and optionally, a silicon containing linker. The photocatalyst is bonded to the fiber by means of a first functional group pre-present on the fiber and optionally, a second functional group generated by a silicon containing linker. The chemical bonding between the fiber and the photocatalyst imparts durability and wash ability to the fiber. A packaging material prepared using the fiber of the present disclosure can be used for the storage of plant produce.

17 Claims, 3 Drawing Sheets

Figure 1:
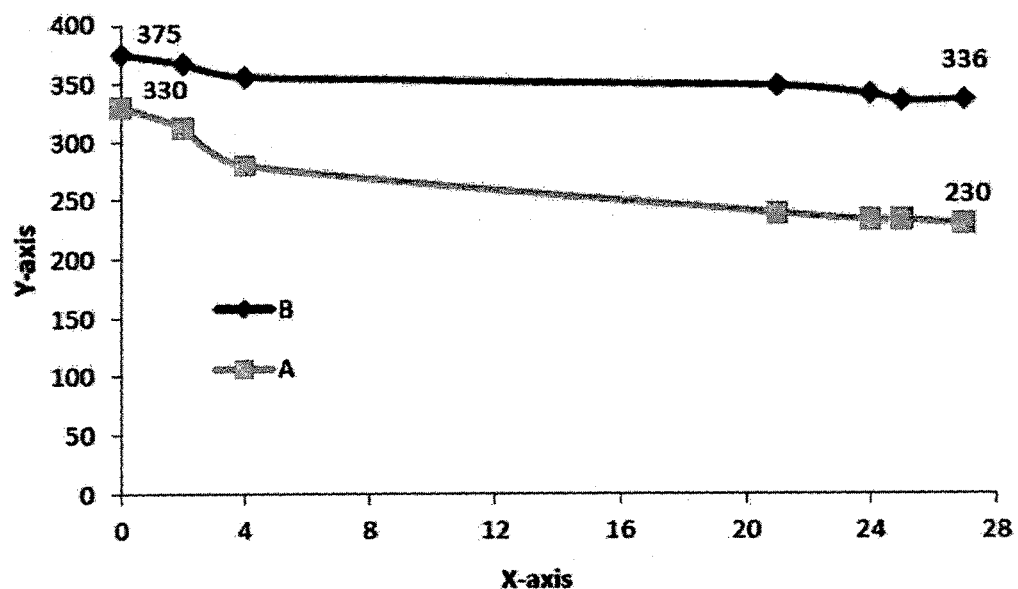

(51) Int. Cl.

| | | |
|---|---|---|
| *D06M 11/44* | (2006.01) | |
| *D06M 11/46* | (2006.01) | |
| *D06M 11/77* | (2006.01) | |
| *D06M 13/50* | (2006.01) | |
| *D06M 13/503* | (2006.01) | |
| *D06M 13/51* | (2006.01) | |
| *D06M 13/513* | (2006.01) | |
| *D06M 13/507* | (2006.01) | |
| *B01J 35/00* | (2006.01) | |
| *B01D 53/88* | (2006.01) | |
| *D06M 11/79* | (2006.01) | |

(52) U.S. Cl.
CPC ............ *D06M 11/44* (2013.01); *D06M 11/46* (2013.01); *D06M 11/77* (2013.01); *D06M 11/79* (2013.01); *D06M 13/50* (2013.01); *D06M 13/503* (2013.01); *D06M 13/507* (2013.01); *D06M 13/51* (2013.01); *D06M 13/513* (2013.01); *B01D 2253/108* (2013.01); *B01D 2253/25* (2013.01); *B01D 2255/20707* (2013.01); *B01D 2255/50* (2013.01); *B01D 2255/802* (2013.01); *B01D 2257/7022* (2013.01)

(58) Field of Classification Search
CPC .. D06M 13/507; D06M 11/46; A06M 13/503; B01J 25/004; B01D 53/885; B01D 2255/802; B01D 2257/7022; B01D 2253/108
See application file for complete search history.

FIBER SUITABLE FOR PACKAGING AND STORING PLANT PRODUCE

FIELD OF DISCLOSURE

The present disclosure relates to a fiber suitable for packaging and storing plant produce.

BACKGROUND

During the post-harvest storage of plant produce, such as fruits, vegetables and flowers, it is observed that a natural ripening agent (ethylene gas) is released into the surrounding or into the storage containers leading to a change in color, texture, aroma, and nutritional quality of the plant produce. It is also observed that excessive or uncontrolled levels of ethylene gas may result in premature ripening of fruits and vegetables, the fading and wilting of cut flowers, loss of green color, increase in the bitterness of vegetables and the like. Therefore, it is desirable to control the ethylene gas concentration in order to prolong the shelf-life of plant produce. This can be achieved either by reducing the formation of ethylene gas by the plant produce or by reducing the concentration of ethylene gas already formed.

Conventionally, the formation of ethylene gas is reduced either by storing the plant produce in a cold storage at a temperature of −1 to +12° C. and at a relative atmospheric moisture of 80 to 90% or by storing it in a controlled atmosphere at a temperature range of 0 to 5° C. with approximately 3% of oxygen and 0 to 5% of carbon dioxide. However, the above stated storage conditions negatively influence the taste of certain plant produce due to low oxygen content and high carbon dioxide content.

Further, known methods disclose the use of oxidizing agents to convert ethylene gas into carbon dioxide and water. The oxidizing agent includes potassium bromate supported on activated charcoal; silver, alumina, copper and aluminum chloride exchanged zeolite A; palladium chloride supported on carbon; sodium chloride saturated on silica and zeolites; sodium and potassium permanganate impregnated on various carriers like activated carbon, alumina, zeolites and diatomaceous earth. Among these potassium permanganate is observed to be the most effective for converting ethylene into carbon dioxide and water. However, leaching of potassium permanganate at a high humidity of 80 to 90% limits its use.

Packaging containers prepared by using fibers containing silver and copper exchanged hydrophilic zeolites like Zeolite A and X impart good antimicrobial properties but have a limited capacity to remove ethylene.

Therefore, there is a need to envisage a fiber suitable for packaging and capable of reducing the ethylene gas evolved during the ripening process of the stored plant produce.

Definition

The term "fiber" in the context of the present disclosure includes natural or synthetic fibers. The fibers of the present discourse are in the form of discrete fibers, woven fibers, non-woven fibers, yarns, mono filaments, spun filaments, staple filaments, bi-component filaments, multi-component filaments, mono-component yarns, bi-component yarns, multicomponent yarns, fabrics, sheets and mats.

OBJECTS

Some of the objects of the present disclosure are described herein below:

It is an object of the present disclosure to provide a fiber which is suitable for packaging plant produce.

It is another object of the present disclosure to provide a fiber which is capable of adsorbing ethylene gas and converting it into carbon dioxide and water.

It is yet another object of the present disclosure to provide a fiber which is dust proof, antimicrobial and washable.

It is still further object of the present disclosure to provide an economic and simple process for the preparation of a fiber.

Other objects and advantages of the present disclosure will be more apparent from the following description when read in conjunction with the accompanying drawing, which are not intended to limit the scope of the present disclosure.

BRIEF DESCRIPTION OF THE ACCOMPANYING DRAWING

FIG. 1: illustrates the ethylene adsorption capacity of the fiber of the present disclosure, in which A represents ethylene adsorption capacity of T-Cotton, B represents ethylene adsorption capacity of the control Cotton (Cotton without photocatalyst), X-axis represents time in hrs. and, Y-axis represents concentration of ethylene in parts per million (ppm).

Figure 2:
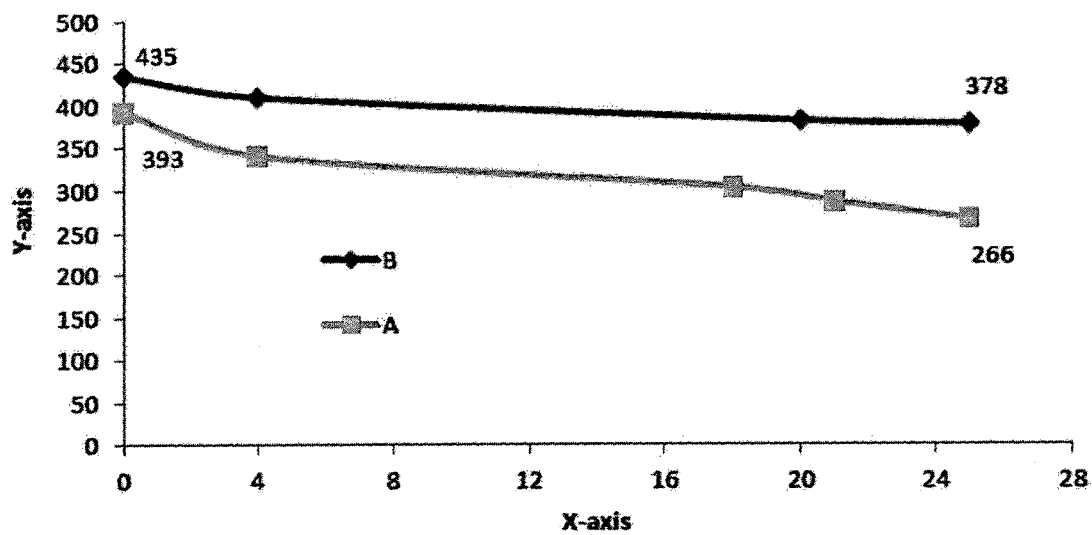

FIG. 2: illustrates the ethylene adsorption capacity of the fiber of the present disclosure, in which A represents ethylene adsorption capacity of T-Jute, B represents ethylene adsorption capacity of the control Jute (Jute without photocatalyst), X-axis represents time in hrs. and Y-axis represents concentration of ethylene in parts per million (ppm).

Figure 3:
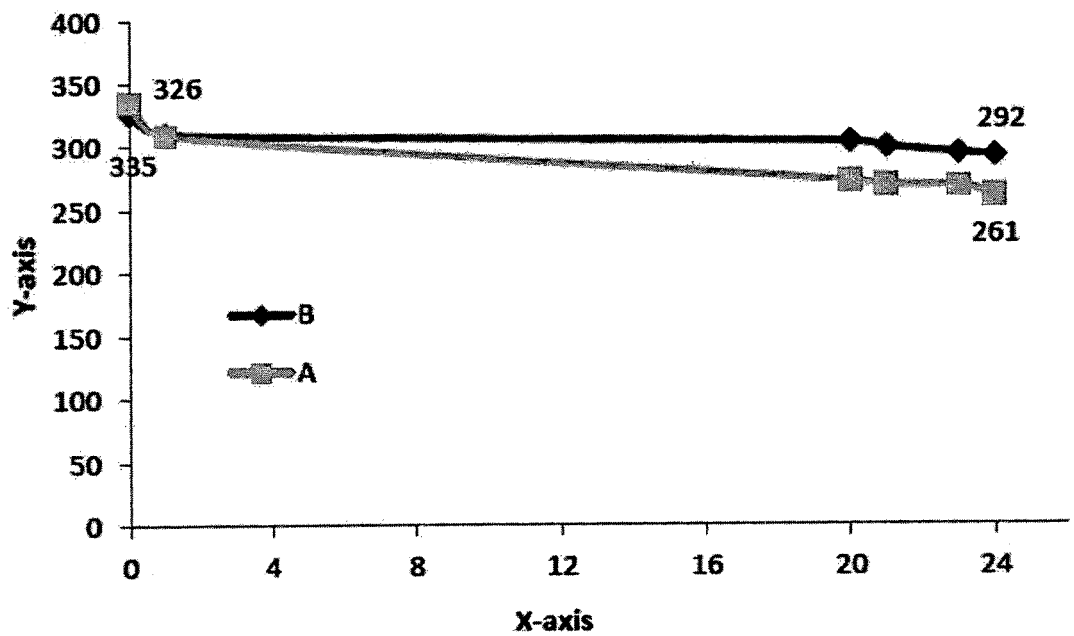

FIG. 3: illustrates the ethylene adsorption capacity of the fiber of the present disclosure, in which A represents ethylene adsorption capacity of T-Paper, B represents ethylene adsorption capacity of the control Paper (Paper without photocatalyst), X-axis represents time in hrs. and Y-axis represents concentration of ethylene in parts per million (ppm).

Figure 4:
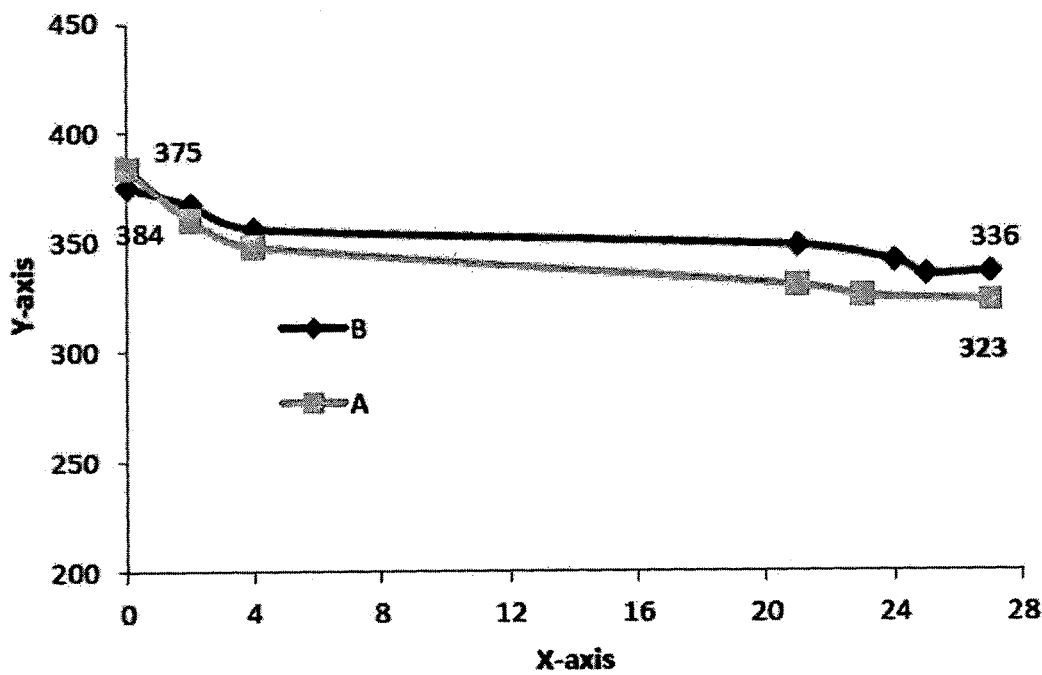

FIG. 4: illustrates the ethylene adsorption capacity of the fiber of the present disclosure, in which A represents ethylene adsorption capacity of TZ-Cotton, B represents ethylene adsorption capacity of the control Cotton (Cotton without photocatalyst), X-axis represents time in hrs. and Y-axis represents concentration of ethylene in parts per million (ppm).

Figure 5:
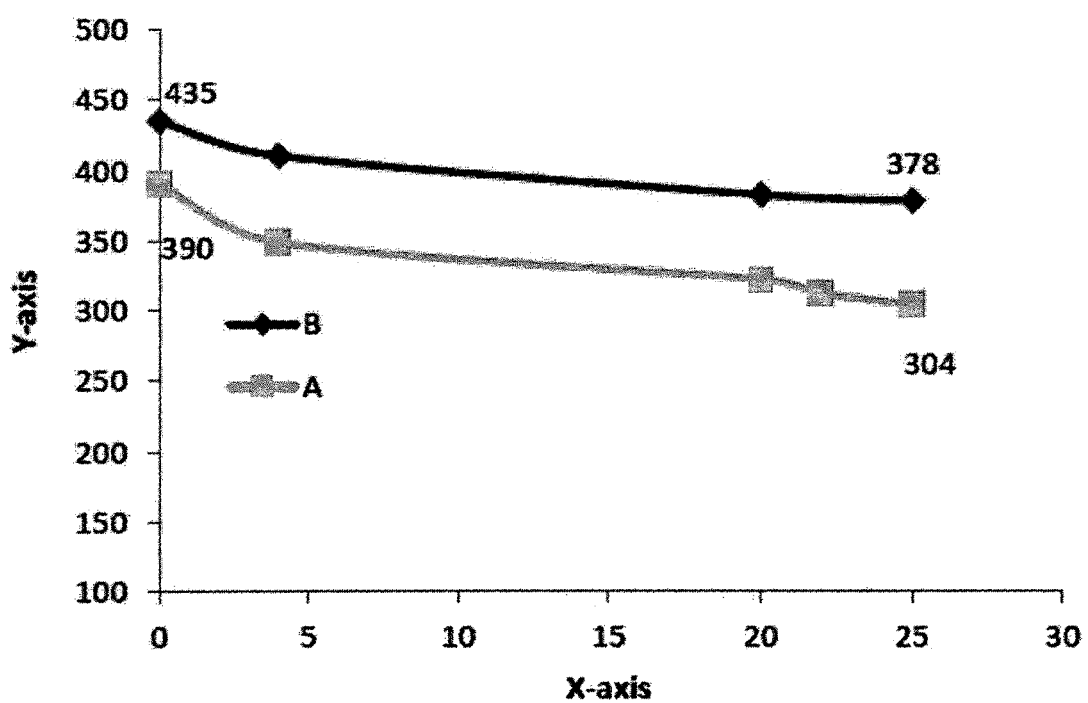

FIG. 5: illustrates the ethylene adsorption capacity of the fiber of the present disclosure, in which A represents ethylene adsorption capacity of TZ-Jute, B represents ethylene adsorption capacity of the control Jute (Jute without photocatalyst), X-axis represents time in hrs. and Y-axis represents concentration of ethylene in parts per million (ppm).

SUMMARY

In accordance with one aspect of the present disclosure there is provided a fiber suitable for packaging; said fiber comprising a photocatalyst and optionally, a silicon containing linker;

characterized in that said photocatalyst is bonded to the fiber by means of a first functional group pre-present on said fiber and optionally, a second functional group generated by a silicon containing linker.

The fiber can be natural fiber of plant material selected from the group consisting of cotton, jute and cellulosic material; or the fiber can be synthetic fiber of polymeric material.

The photo-catalyst can be at least one selected from the group consisting of titanium iso-propoxide, zinc oxide, metal doped titania and non-metal doped titania.

The metal doped titania can comprise at least one metal selected from the group consisting bismuth, cerium, lanthanum, iron and zinc.

The non-metal doped titania can comprise at least one non-metal selected from the group consisting of nitrogen and sulfur:

The photo-catalyst can be embedded in at least one adsorbent substrate.

The adsorbent substrate can be at least one selected from the group consisting of Ag exchanged ZSM 5 zeolite, zeolite A, alumina and silica.

The particle size of the adsorbent substrate can range between of 0.1 nm and 150 nm.

The bond between the fiber and the photo-catalyst can be at least one bond from the group consisting of covalent, ionic, hydrogen, zwitterion, electron-pair, van der waals forces and pi bond interaction.

The silicon containing linker can be at least one selected from the group consisting of tetramethyl ortho silicate, trimethoxy silane, tetraethyl orthosilicate, triethoxy silane, methyl-dimethoxy silane, methyl-diethoxy silane, methyl-trimethoxy silane, cyclohexyl triethoxy silane, methyl-triethoxy silane, methyl-tripropoxy silane, methyl-tributoxysilane, propyl-trimethoxy silane, propyl-triethoxy silane, allyl-triethoxy silane, n-butyl trimethoxy silane, n-butyl triethoxy silane, i-butyl-trimethoxy silane, butyl-triethoxy silane, dodecyl-trimethoxy silane In accordance with yet another aspect of the present disclosure there is provided a process for preparing a fiber suitable for packaging, said process comprising the following steps:
 a) refluxing the fiber with a mixture comprising at least one photocatalyst, at least one solvent and optionally, at least one silicon containing linker, at a temperature ranging between 40° C. and 90° C. to obtain a treated fiber; and
 b) washing, and drying said treated fiber to obtain a fiber suitable for packaging.

The proportion of silicon containing linker to the photo-catalyst can be in the range of 1:1 and 300:1

The photo-catalyst can be embedded in adsorbent substrate and said photocatalyst is obtained by a method comprising the following steps:
 i. treating at least one adsorbent substrate with a mixture comprising at least one vehicle and at least one photocatalyst under stirring for a time period of 30 min to 5 hrs to obtain slurry; wherein, the proportion of the adsorbent substrate to the mixture is in the range of 5:1 to 50:1
 ii. drying the slurry at a temperature of 50° C. to 200° C. for a time period of 30 min to 5 hrs. to obtain an un-hydrolyzed photocatalyst embedded in adsorbent substrate; and
 iii. hydrolyzing the un-hydrolyzed photocatalyst embedded in adsorbent substrate with water to obtain a hydrolyzed photocatalyst embedded in adsorbent substrate; and
 iv. drying and calcining the hydrolyzed photocatalyst embedded in adsorbent substrate to obtain a photocatalyst embedded in adsorbent substrate.

In accordance with yet another aspect there is provided a packaging material prepared using the fiber of the present disclosure.

DETAILED DESCRIPTION

It is well known that the ethylene gas evolved as a result of the biological processes during the storage of plant produce accelerates the ripening process, and thus shortens the shelf life of the stored plant produce. Accordingly, various attempts have been made to develop a fiber suitable for packaging and capable of converting ethylene gas into the carbon dioxide and water. However, the packaging prepared using these fibers are not washable, not reusable and ineffective under humid atmosphere.

Therefore, with the aim of obviating the problems associated with known methods, the inventors of the present disclosure envisaged a fiber comprising a photocatalyst and optionally a silicon containing linker. The photocatalyst has the ability to convert ethylene gas evolved during the storage of plant produce into carbon dioxide and water, while the bond between the fiber and a photocatalyst imparts durability and wash ability to the fiber and the packaging material prepared using the fiber of the present disclosure.

In accordance with one aspect of the present disclosure there is provided a fiber comprising a photocatalyst and optionally, a silicon containing linker. The photocatalyst is bonded to the fiber by means of a first functional group pre-present on the fiber and optionally, a second functional group generated by a silicon containing linker.

The fiber used in the present disclosure can be natural fiber of plant material selected from the group consisting of cotton, jute and cellulosic material; or the fiber can be synthetic fiber of polymeric material.

The photo-catalyst of the present disclosure is bonded to the fiber through a first functional group pre-present on the fiber in order to provide durability and wash ability to the packaging material. The bond between the fiber and the photo-catalyst can be at least one bond from the group consisting of covalent, ionic, polar covalent, electrovalent, hydrogen, zwitterion, electron-pair, co-ordinate covalent, van der waals forces, cation pi interaction and ion pi interaction.

In accordance with one embodiment of the present disclosure the photo-catalyst is bonded to the fiber through a first functional group pre-present on the fiber and the second functional group generated by the silicon containing linker.

The silicon containing linker present in the fiber of the present disclosure is at least one selected from the group consisting of tetramethyl ortho silicate, trimethoxy silane, tetraethyl orthosilicate, triethoxy silane, methyl-dimethoxy silane, methyl-diethoxy silane, methyl-trimethoxy silane, cyclohexyl triethoxy silane, methyl-triethoxy silane, methyl-tripropoxy silane, methyl-tributoxysilane, propyl-trimethoxy silane, propyl-triethoxy silane, allyl-triethoxy silane, n-butyl trimethoxy silane, n-butyl triethoxy silane, i-butyl-trimethoxy silane, i-butyl-triethoxy silane, dodecyl-trimethoxy silane The photo-catalyst capable of converting ethylene gas into carbon dioxide and water is selected from the group consisting of titanium iso-propoxide, titanium dioxide, zinc oxide, metal doped titania non-metal doped titania and combinations thereof.

In accordance with one embodiment of the present disclosure the photo-catalyst is embedded on the adsorbent substrate. The adsorbent substrate is selected from the group consisting of zeolite, Ag exchange ZSM 5 zeolite Zeolite A, alumina, silica and combinations thereof.

The adsorbent substrate is characterized as nano-scaled porous structure having particle size in the range of 0.1 nm to 150 nm. The porous structure and the nano size of the adsorbent substrate increases the surface area for adsorption of ethylene gas released by plant produce. The adsorbed ethylene gas is then converted into carbon dioxide and water by the photo-catalyst embedded adsorbent.

In accordance with one of the exemplary embodiments of the present disclosure the photo-catalyst is titanium iso-propoxide.

In accordance with another exemplary embodiment of the present disclosure the fiber comprises titanium iso-propoxide embedded on Ag exchanged ZSM 5 zeolite as a photo-catalyst. The presence of silver (Ag) in the ZSM 5 zeolite imparts additional antimicrobial property to the packaging prepared using the fiber of the present disclosure.

In accordance with one of the embodiments of the present disclosure the photo-catalyst is covalently bonded to the fiber In accordance with another aspect of the present disclosure there is provided a process for preparing a fiber suitable for packaging. The process includes the following steps:

In the first step, a fiber is refluxed with a mixture comprising a photocatalyst, solvent and optionally, a silicon containing linker at a temperature ranging between 40° C. and 90° C. to obtain a treated fiber.

The fiber used in the present disclosure can be natural fiber of plant material selected from the group consisting of cotton, jute and cellulosic material; or the fiber can be synthetic fiber of polymeric material.

In the second step, the treated fiber is washed and dried to obtain a fiber suitable for packaging. The proportion of silicon containing linker to the photocatalyst is in the range of 1:1 and 300:1.

The solvent includes methanol, ethanol, propanol, butanol and pentanol.

The photo-catalyst is bonded to the fiber by means of a first functional group pre-present on said fiber and optionally, a second functional group generated by a silicon containing linker.

The bond between the fiber and the photo-catalyst can be at least one bond from the group consisting of covalent, ionic, polar covalent, electrovalent, hydrogen, zwitterion, electron-pair, co-ordinate covalent, van der waals forces, cation pi interaction and ion pi interaction.

The photocatalyst used in the present disclosure is selected from the group consisting of titanium iso-propoxide, titanium dioxide, zinc oxide, metal doped titanic and non-metal doped titania.

Typically, the metal doped titania comprises at least one metal selected from the group consisting bismuth, cerium, lanthanum, iron, and zinc.

Typically, the non-metal doped titania comprises at least one non-metal selected from the group consisting of nitrogen and sulfur.

In accordance with the present disclosure the photocatalyst embedded on the adsorbent substrate is obtained by a method which includes the following steps:

In the first step, the adsorbent substrate is treated with a mixture comprising at least one vehicle and at least one photocatalyst under stirring for a time period of 30 min to 5 hrs to obtain slurry. The proportion of the adsorbent to the mixture ranges between 5:1 and 50:1.

Typically, the vehicle includes methanol, ethanol, propanol and butanol.

In the second step, the slurry is dried at a temperature of 50° C. to 200° C. for a time period of 30 min to 5 hrs. to obtain an un-hydrolyzed photocatalyst embedded adsorbent substrate.

In the third step, the un-hydrolyzed photocatalyst embedded adsorbent is hydrolyzed with water to obtain a hydrolyzed photocatalyst embedded on the adsorbent substrate.

In the fourth step, the hydrolyzed photocatalyst embedded adsorbent is washed, dried and calcined to obtain a photocatalyst embedded on the adsorbent substrate.

The adsorbents may be selected the group consisting of Ag exchanged ZSM 5 zeolite, zeolite A, alumina, silica and combinations thereof. The adsorbents are characterized as nano-scaled porous structures having particle size in the range of 0.1 nm to 150 nm.

The fiber of the present disclosure has its extensive end use application in preparing a packaging material for storage of plant produce.

Hereinafter, the present disclosure will be described in more detail with reference to the following examples, but the scope of the present disclosure is not limited thereto.

Example 1: Titanium (IV) Isopropoxide Treated Cotton Fabric 10 g cotton fabric (falalen cloth) was refluxed with titanium (IV) isopropoxide solution (20% titanium (IV) isopropoxide solution in 2-propanol) in the ratio of 1:10 for 1 h at 75-80° C. The treated cotton fabric was rolled to remove excess physisorbed material and oven dried at 70° C. for 2 h. Thus prepared cotton fabric was referred as T-Cotton.

T-Cotton fabric was evaluated in the presence of fluorescent lamp for ethylene adsorption capacity in airtight round bottom glass flask (RBF) maintained at 40° C. in an oven wherein 1 g of modified fabric sample was kept and known amount (between 100 to 400 parts per million) of ethylene was introduced. During all the catalytic evaluation study control cloth/fiber (i.e., un-modified cloth/fiber) was kept as control experiment and almost similar amount of ethylene was also introduced in the control experiment. The reduction of the ethylene content was determined periodically by extracting 0.5 µL of gas through air tight gas syringe and analysed by gas chromatograph.

T-Cotton removed 30.3% (100 ppm) of ethylene/g of cotton fabric after 27 h whereas control cotton removed 10.4% (39 ppm) of ethylene/g of cotton fabric under similar conditions and results are shown in FIG. 1.

Example 2: Titanium (IV) Isopropoxide Treated Jute 10 g Jute fibers were refluxed with titanium (IV) isopropoxide solution (20% titanium (N) isopropoxide solution in 2-propanol) in the ratio of 1:10 for 1 h at 75-80° C. The treated jute fibers were rolled to remove excess physisorbed material and oven dried at 70° C. for 2 h. Thus prepared jute fibers were referred as T-Jute.

Treated Jute fibers (T-Jute) removed 34.3% (127 ppm) of ethylene/g of Jute fibers after 25 h whereas control Jute fibers removed 13.1% (57 ppm) of ethylene/g of Jute fibers under similar conditions as described in example 1 and results are presented in FIG. 2.

Example 3: Titanium (IV) Isopropoxide Treated Cellulosic Paper 10 g cellulosic paper was dipped in titanium (IV) isopropoxide solution (20% titanium (IV) isopropoxide solution in 2-propanol) in the ratio of 1:10 for 3 h at 30° C.

Additional solution was decanted and treated paper was oven dried at 70° C. for 2 h. Thus prepared sample was designated as T-Paper.

T-Paper removed 22.0% (74 ppm) of ethylene/g of cellulosic paper after 24 h whereas control cellulosic paper removed 10.4% (34 ppm) of ethylene/g of cellulosic paper under similar conditions as evaluated for PSF fabric as described in example 0.1 and results are shown in FIG. 3.

Example 4: Immobilization of Adsorbent Cum Catalyst on Cotton

A) Preparation of Photocatalyst Embedded Adsorbent:

NaZSM-5 was prepared in static mode under hydrothermal conditions using mixed template having a molar gel composition of 200 $SiO_2$: $Al_2O_3$: 55.6 $Na_2O$: 3.13 TEBA (triethylbutyl ammonium bromide): 3.13 EDA (ethylene diamine): 4227 $H_2O$ at 170° C. temperature for 48 h previously aged at 110° C. for 17 h. After hydrothermal treatment, solid product was recovered, washed, dried at 120° C. for 6 h in oven and finally calcined at 550° C. in air flow for 6 h. Prepared NaZSM-5 zeolite was treated at 80° C. for 4 h using 1% aqueous silver nitrate ($AgNO_3$) solution maintaining solid to liquid ratio of 1:80. Thus treated zeolite powder was filtered, washed with distilled water and dried at 90° C. for 8 h to obtain Ag-ZSM-5 zeolite powder.

In-situ incorporation of photocatalyst into the above prepared Ag-ZSM-5 zeolite powder was done by preparing a solution of 2-propanol (3.5 mL) and titanium (IV) isopropoxide (0.7 mL) in the ratio 5:1 under stirring for 30 min (Soln. A) and adding to slurry of previously prepared Ag-exchanged zeolite (7 g) and 2-propanol (10 mL) under stirring for 2 h. Solvent from slurry was removed to obtain adsorbent cum catalyst powder having un-hydrolysed catalyst. Thus obtained slurry sample was dried at 120° C. for 3 h.

Thus prepared zeolite powder was further treated with water to hydrolyze titanium (IV) isopropoxide and was dried in oven at 100° C. for 16 h and finally calcined at 450° C. for 6 h to obtain photocatalyst embedded adsorbent.

b) Immobilization of Photocatalyst Embedded Adsorbent on Cotton:

10 g cotton fabric (falalen cloth) was refluxed in round bottom flask (RBF) with 100 g tetraethyl orthosilicate solution (20% TEOS solution in ethanol) and 1.0 g photocatalyst embedded adsorbent for 40-45 min at 70° C. The treated cotton fabric was rolled to remove excess of physisorbed material and dried at 70° C. for 1 h in oven. Thus prepared cotton fabric was designated as TZ-Cotton.

TZ-Cotton fabric removed 15.9% (61 ppm) of ethylene/g of fabric after 27 h whereas control PSF removed 10.4% (39 ppm) of ethylene/g of fabric as evaluated under similar conditions as described in example 1 and results are presented in FIG. 4.

Example 5: Immobilization of Photocatalyst Embedded Adsorbent on Jute 10 g jute was refluxed in round bottom flask (RBF) with 100 g tetraethyl orthosilicate solution (20% TEOS solution in ethanol) and 1.0 g photocatalyst embedded adsorbent (as described in example 4) for 40-45 min at 70° C. The treated jute fabric was rolled to remove excess of physisorbed material and dried at 70° C. for 1 h in oven. Thus prepared jute fibers were designated as TZ-Jute.

TZ-Jute fibers removed 22.1% (86 ppm) of ethylene/g of fibers after 25 h whereas control PSF removed 13.1% (57 ppm) of ethylene/g of fiber (FIG. 5) as evaluated under similar conditions as described in example 1.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "a", "at least" or "at least one" suggests the use of one or more elements or ingredients or quantities, as the use may be in the embodiment of the disclosure to achieve one or more of the desired objects or results.

The numerical values given for various physical parameters, dimensions and quantities are only approximate values and it is envisaged that the values higher or lower than the numerical value assigned to the physical parameters, dimensions and quantities fall within the scope of the disclosure and the claims unless there is a statement in the specification to the contrary.

While certain embodiments of the disclosure have been described, these embodiments have been presented by way of examples only, and are not intended to limit the scope of the disclosure. Variations or modifications in the process of this disclosure, within the scope of the disclosure, may occur to those skilled in the art upon reviewing the disclosure herein. Such variations or modifications are well within the spirit of this disclosure.

The invention claimed is:

1. A fiber suitable for packaging and storing plant produce; said fiber comprising a photocatalyst and optionally, a silicon containing linker;
   characterized in that said photocatalyst is bonded to the fiber by means of a first functional group pre-present on said fiber and optionally, a second functional group generated by said silicon containing linker, wherein said photo-catalyst is at least one selected from the group consisting of titanium iso-propoxide, zinc oxide, metal doped titania and non-metal doped titania, wherein the metal doped titania comprises at least one metal selected from the group consisting bismuth, cerium, lanthanum, iron and zinc; and
   wherein the non-metal doped titania comprises at least one non-metal selected from the group consisting of nitrogen and sulfur.

2. The fiber as claimed in claim 1, wherein the fiber is natural fiber of plant material selected from the group consisting of cotton, jute and cellulosic material; or the fiber is synthetic fiber of polymeric material.

3. The fiber as claimed in claim 1, wherein the photocatalyst is embedded in at least one adsorbent substrate.

4. The fiber as claimed in claim 3, wherein the adsorbent substrate is at least one selected from the group consisting of Ag exchanged ZSM 5 zeolite, zeolite A, alumina and silica.

5. The fiber as claimed in claim 3, wherein the particle size of the adsorbent substrate ranges between of 0.1 nm and 150 nm.

6. The fiber as claimed in claim 1, wherein the bond between the fiber and the photo-catalyst is at least one bond from the group consisting of covalent, ionic, hydrogen, zwitterion, electron-pair, van der waals forces and pi bond interaction.

7. The fiber as claimed in claim 1, wherein the silicon containing linker is at least one selected from the group consisting of tetramethyl ortho silicate, trimethoxy silane, tetraethyl orthosilicate, triethoxy silane, methyl-dimethoxy silane, methyl-diethoxy silane, methyl-trimethoxy silane, cyclohexyl triethoxy silane, methyl-triethoxy silane, methyl-tripropoxy silane, methyl-tributoxysilane, propyl-trimethoxy silane, propyl-triethoxy silane, allyl-triethoxy silane, n-butyl trimethoxy silane, n-butyl triethoxy silane, i-butyl-trimethoxy silane, i-butyl-triethoxy silane and dodecyl-trimethoxy silane.

8. A process for preparing a fiber as claimed in claim 1 suitable for packaging and storing plant produce, said process comprising the following steps:
   a) refluxing the fiber with a mixture comprising at least one photocatalyst, at least one solvent and optionally, at least one silicon containing linker, at a temperature ranging between 40° C. and 90° C. to obtain a treated fiber; and
   b) washing, and drying said treated fiber to obtain a fiber suitable for packaging.

9. The process as claimed in claim 8, wherein the proportion of silicon containing linker to the photocatalyst is in the range of 1:1 and 300:1.

10. The process as claimed in claim 8, wherein the photocatalyst is at least one selected from the group consisting of titanium iso-propoxide, zinc oxide, metal doped titania and non-metal doped titania.

11. The process as claimed in claim 10, wherein the metal doped titania comprises at least one metal selected from the group consisting bismuth, cerium, lanthanum, iron and zinc; and the non-metal doped titania comprises at least one non-metal selected from the group consisting of nitrogen and sulfur.

12. The process as claimed in claim 8, wherein the photo-catalyst is embedded in adsorbent substrate and said photocatalyst is obtained by a method comprising the following steps:
   i. treating at least one adsorbent substrate with a mixture comprising at least one vehicle and at least one photocatalyst under stirring for a time period of 30 min to 5 hrs to obtain slurry; wherein, the proportion of the adsorbent substrate to the mixture is in the range of 5:1 to 50:1
   ii. drying the slurry at a temperature of 50° C. to 200° C. for a time period of 30 min to 5 hrs. to obtain an un-hydrolyzed photocatalyst embedded in adsorbent substrate; and
   iii. hydrolyzing the un-hydrolyzed photocatalyst embedded in adsorbent substrate with water to obtain a hydrolyzed photocatalyst embedded in adsorbent substrate; and
   iv. drying and calcining the hydrolyzed photocatalyst embedded in adsorbent substrate to obtain a photocatalyst embedded in adsorbent substrate.

13. The process as claimed in claim 12, wherein the photo-catalyst is at least one selected from the group consisting of titanium iso-propoxide, zinc oxide, metal doped titania and non-metal doped titania.

14. The process as claimed in claim 13, wherein the metal doped titania comprises at least one metal selected from the group consisting bismuth, cerium, lanthanum, iron and zinc; and the non-metal doped titania comprises at least one non-metal selected from the group consisting of nitrogen and sulfur.

15. The process as claimed in claim 12, wherein the adsorbent substrate is at least one selected from the group consisting of Ag exchanged ZSM 5 zeolite, zeolite A, alumina and silica.

16. The process as claimed in claim 12, wherein the particle size of the adsorbent substrate ranges between of 0.1 nm and 150 nm.

17. A packaging material for storing plant produce prepared using the fiber as claimed in claim 1.

* * * * *